Sept. 30, 1952  E. V. MURPHREE  2,612,438
FLUIDIZED SOLIDS CONTACTING APPARATUS
Filed Feb. 5, 1948  3 Sheets-Sheet 1

Eger V. Murphree Inventor
By  Attorney

Sept. 30, 1952 E. V. MURPHREE 2,612,438
FLUIDIZED SOLIDS CONTACTING APPARATUS
Filed Feb. 5, 1948 3 Sheets-Sheet 2

Eger V. Murphree Inventor
By J. K. Arnold Attorney

Sept. 30, 1952 — E. V. MURPHREE — 2,612,438
FLUIDIZED SOLIDS CONTACTING APPARATUS
Filed Feb. 5, 1948 — 3 Sheets-Sheet 3

Eger V. Murphree Inventor
By _____ Attorney

Patented Sept. 30, 1952

2,612,438

UNITED STATES PATENT OFFICE 2,612,438

FLUIDIZED SOLIDS CONTACTING APPARATUS

Eger V. Murphree, Summit, N. J., assignor to Standard Oil Development Company, a corporation of Delaware Application February 5, 1948, Serial No. 6,447

3 Claims. (Cl. 23—288)

This invention pertains to an improved apparatus for carrying out catalytic reactions wherein finely divided catalyst particles are held in suspension in the reactant materials, and particularly to the stripping of adsorbed and entrained fluidal materials from the solid catalyst particles utilized in the catalytic conversion of hydrocarbons.

There has been developed in recent years in certain catalytic operations, a method which is commonly referred to as the fluid catalyst method or technique in which finely divided solid catalyst particles are carried through a reaction zone in a stream of vapors undergoing reaction. This method or technique is applicable to a wide variety of catalytic reactions and while for puroses of illustration this invention will be specifically described in connection with the catalytic cracking of hydrocarbons, it is to be understood that the invention is not limited thereto, but may be used in other catalytic processes or in other catalytic conversions of hydrocarbons where it is desired to remove vapors or gases from dense, fluidized, liquid-simulating mixtures of solid catalyst particles and gaseous fluids.

In one embodiment of the fluid catalyst technique the vaporous reactants and catalysts are introduced into the bottom of the reaction vessel, passed upwardly therethrough and are discharged into separation equipment in which the catalyst is separated from the vaporous products and returned to the reaction vessel preferably after regeneration. In a modified or improved design of catalytic cracking unit, the divided catalysts or contact particles are maintained by "hindered settling" in a dense, dry, fluidized, liquid-simulating condition in the lower portion of the reaction zone wherein hydrocarbons in vapor or gas form are contacted with the solid particles. The hydrocarbon vapors or gases pass upwardly through the dense, fluidized mixture in the reaction zone and the vaporous products are taken overhead from the reaction zone.

During the catalytic cracking of hydrocarbons and also in other catalytic conversions of hydrocarbon materials, coke or carbonaceous material is deposited on the catalyst or contact particles thereby reducing or destroying their catalytic activity. The contaminated or spent catalyst must be regenerated before being reused in the cracking or other catalytic operation. In the regeneration the contaminated or spent catalyst particles are withdrawn as a dense, fluidized mixture from the lower portion of the reaction zone and the carbon or other combustible materials contacted with air or other regenerating gas which burns off the carbonaceous deposits.

The contaminated, spent catalyst or contact particles withdrawn from the lower portion of the reaction zone contain adsorbed and entrained hydrocarbon vapors or gases and before regenerating the particles it is preferred practice to remove the strippable hydrocarbons in a stripping or purging operation. The efficient stripping of hydrocarbon vapors from the spent catalyst in the fluid catalytic cracking operation remains an important and pressing problem even after several years of commercial operation of these plants. Most of the commercial units are limited in their throughput by the capacity of their carbon burning systems, yet 10 to 30% of the oxygen supplied to the regenerative system goes to the combustion of gases or strippable hydrocarbons carried to the regenerator by the spent catalyst. Besides greatly reducing the feed throughput, these strippable hydrocarbons, amounting anywhere from 0.5 to 1.5 weight per cent on feed, represent a sizable loss of potential products. The present invention relates to an improved design for a stripping or purging section or zone for a fluidized solids reactor.

In accordance with the present invention the mixture of catalyst, or contact particles and the hydrocarbons or other reactants are introduced into the bottom portion of a reaction zone through a hollow conical member provided with a perforated distribution plate member. Surrounding the conical member is an annular space formed by a cylindrical sleeve spaced from the inner wall of the reaction vessel. This sleeve extends a distance above and below the distribution plate member to form an annular stripping section at the bottom portion of the reaction vessel. This annular stripping section is subdivided into a plurality of elongated sections by radial baffles of substantially the same length as the above-mentioned sleeve. These baffles form a plurality of separate, vertically arranged, narrow, elongated stripping zones. Steam or other inert stripping gas is introduced into the bottom portion of each stripping zone.

Since the efficacy of a stripping zone is determined by the ratio of the length to the effective diameter of the zone, subdividing the annular stripping section into a plurality of long, narrow sections or cells should give improved stripping. It was found, however, that the efficacy of such cellular strippers was not nearly as good as had been expected. It is believed that the relatively poor performance characteristic of the cellular stripper is attributable to the fact that distribution of the catalyst to the cells and flow through the cells is not uniform particularly during reactor surges and during periods of variation of flow of gases in the stripper and/or the reactor and that under some extreme conditions upflow of catalyst occurs in a number of the cells.

It has now been found that distribution and flow of catalyst through the cells can be made more uniform, upflow of catalyst in the stripping zones can be avoided and the efficiency of cellular strippers can be substantially improved if an orifice is provided at the bottom of each of the long, narrow stripping zones. By providing for a pressure drop of about 0.1 to about 5 lbs. per square inch across this orifice, positive flow of the catalyst particles downwardly in each of the stripping zones can be assured and flow of catalyst through each of the cells during reactor surges and gas flow variations can be made substantially uniform.

Reference is made to the accompanying drawing illustrating the present invention;

Figure 1:
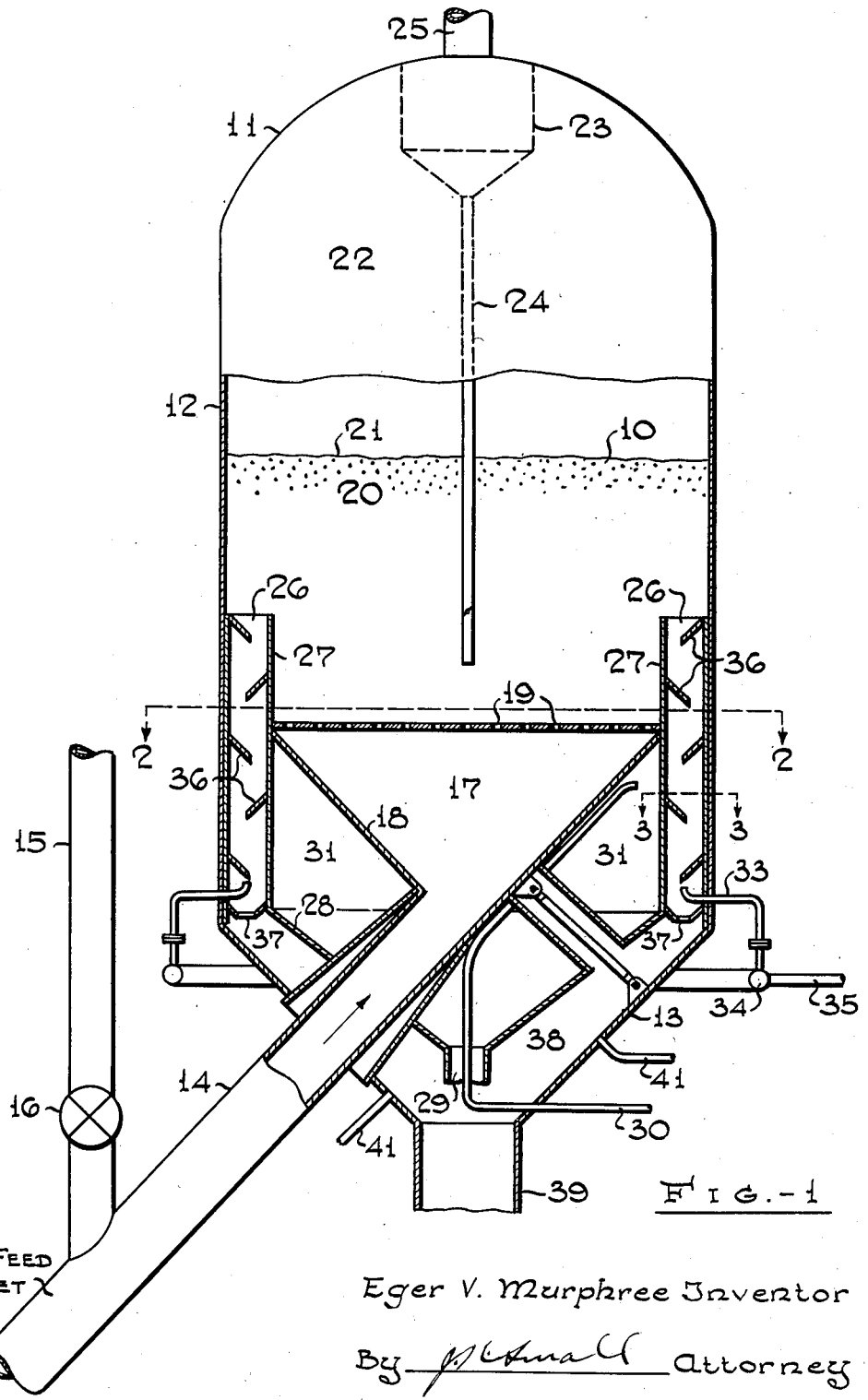
Fig. 1 represents a vertical cross-section of the lower portion of a reaction vessel embodying the present invention.

Referring now to Figure 1 of the drawing, the reaction vessel 10 comprises an upper hemispherical dome section 11, a large cylindrical section 12 and a frustro conical bottom section 13 and is provided with an inlet line 14 for introducing a mixture of reactants and catalyst or contact particles. The catalyst particles are introduced into line 14 from a standpipe or the like 15 which is equipped with a valve 16 for controlling the rate at which the catalyst particles are supplied to line 14 from the standpipe 15.

The suspension of solid catalyst or contact particles in reactant vapors is passed through feed line 14 into an inlet chamber 17 comprising an upwardly flared wall member 18 and a grid member or perforated distribution plate 19 at its upper end. In the form of the apparatus shown in the drawing, the reaction vessel is circular in cross section and the grid member 19 is circular and centrally arranged in the reaction vessel. The diameter of the grid member 19 is less than the internal diameter of the reaction vessel to provide an annular passageway for the withdrawal of catalyst particles from the lower portion of the reaction vessel as will be hereinafter described in greater detail.

The velocity of the gaseous reactant fluid passing upwardly in the reaction vessel 10 is preferably so controlled as to maintain the solid contact or catalyst particles as a dense fluidized liquid-simulating dry mixture or bed 20 having a level indicated at 21. The vaporous reaction products leaving the dense bed 20 entrain a small amount of solid catalyst particles forming a dilute phase or suspension designated at 22 in the upper portion of the reaction vessel 10.

The reaction products and entrained catalyst particles are passed through separating means 23 arranged in the upper portion of the reaction vessel. This separating means, which may be a cyclone separator or the like, separates most of the entrained solid catalyst particles from the vaporous reaction products. The solid catalyst particles separated in the cyclone 23 are returned to the dense bed 20 through the dip leg or pipe 24 which extends below the upper level 21 of the dense bed 20. A valve for controlling return of catalyst particles to the dense bed and means for introducing steam or other fluidizing gas may be provided in the dip leg 24. The vaporous reaction products leaving the separating means 23 pass overhead through line 25 and may then be passed to any suitable equipment to effect further removal of entrained solids and to recover the desired products. In the catalytic cracking or conversion of hydrocarbons the vaporous reaction products are passed to a fractionating system of separate gasoline or motor fuel from gases and higher boiling hydrocarbon constituents.

Removal of catalyst particles from the dense phase of bed 20 is effected through the stripping zone generally indicated at 26 which is formed between the inner wall of the cylindrical shell 12 and a smaller diameter concentric vertically arranged sleeve 27 which surrounds the distribution plate 19 and extends some distance above and also below the said distribution plate. The upper end of the conical wall member 18 is secured as by welding to the distribution plate 19 as well as the sleeve member 27. Secured to the bottom of sleeve member 27 is a conical baffle or wall member 28 for reducing the effective volume below the inlet chamber 17. The conical member 28 is arranged substantially equidistant from the lower conical section 13 of the reactor and is provided with a vent hole 29. A steam bleeding line 30 is provided for supplying steam or the like, to the chamber 31 formed between walls 18, 27, and 28 in order to prevent the accumulation of catalyst particles in said chamber.

The annular space 26 formed between the inner wall of cylindrical shell 12 and the cylindrical sleeve 27 is subdivided into a plurality of long and narrow stripping zones or sections by means of radial baffles 32 which are substantially the same height as the cylindrical sleeve 27 and which extend from the outer wall of cylindrical sleeve 27 to the inner wall of cylindrical shell 12. The number of baffles 32 and accordingly the number of stripping zones provided may be varied as desired. Commercial units having an internal diameter of 25–30 feet may, for example, have the annular stripping section divided into about 40 to 70 or even more stripping zones or cells. An inlet 33 for the supply of steam or other stripping agent is arranged at the bottom of each of the stripping cells, the several inlets being in turn connected to a manifold 34 which is connected by line 35 to a source of supply of stripping gas. The stripping cells are preferably provided with suitable inclined baffles 36 in order to increase the mixing or contact of the upflow of stripping or purging gas and the downflowing spent or contaminated catalyst particles. As shown, the inclined baffles extend alternately from the outer and inner cylindrical wall member 12 and 27 in order to force the catalyst particles to follow a sinuous course down through the stripper cells.

The baffles could also be in the form of alternate discs and donut baffles.

In accordance with the present invention an orifice plate 37 is provided at the bottom of each of the stripper cells. The plates 37 are so designed as to give a pressure drop of from 0.1 to 5.0 lbs. per square inch across the orifice. By providing this pressure drop the flow of catalyst through the several cells is rendered more uniform and the amount of catalyst and vapor recycled from the bottom of one cell up through an adjacent cell is reduced if not completely eliminated. Flow of catalyst through cells which are not provided with a flow restricting orifice in accordance with this invention is subject to wide fluctuation during reactor surges when the dense bed catalyst level varies and particularly during failures or fluctuations in the flow of stripping steam through one or more of the cells.

The catalyst particles discharged from the stripping cells through the orifice plates 37 flow downwardly in the annular conical passageway 38 and are discharged into standpipe 39 which leads to a regenerator or the like for revivifying the spent stripped catalysts in known manner.

Figure 2:
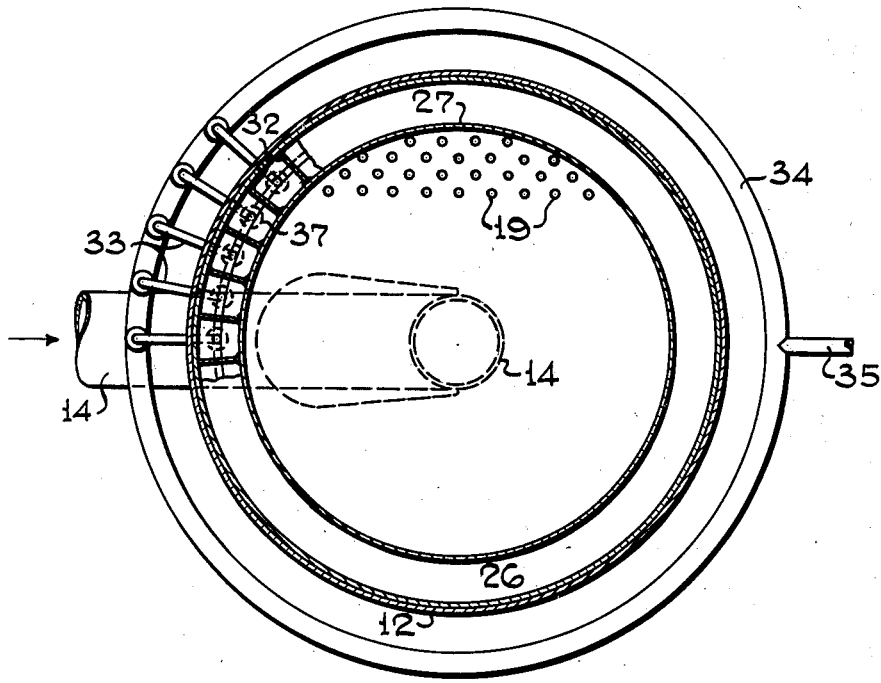
Fig. 2 is a transverse cross-section taken substantially on the line 2—2 of Fig. 1.
Figure 3:
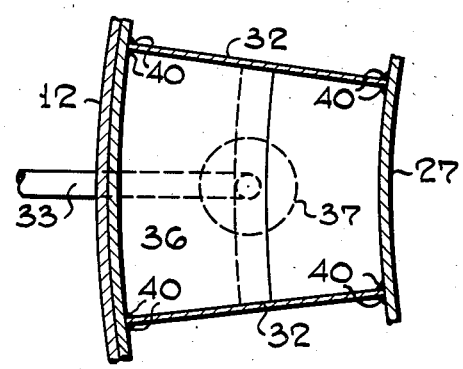
Fig. 3 is an enlarged cross-section of a single cell of the stripping section showing a suitable baffle and stripping agent inlet arrangement.

Figures 2 and 3 show in somewhat more detail the arrangement of stripping cell. As there shown the radial baffles 32 are secured to the inner wall of the cylindrical outer shell 12 and to the outer wall of the inner cylindrical sleeve 27 as by welding at 40. The inclined baffles 36 arranged in each of the stripper cells are secured to the radial baffles 32 or to the cylindrical sleeve 27 or the outer cylindrical wall 12. Other baffle arrangements such as alternate disc and donut baffles could be provided in order to increase the contact of the catalyst particles and stripping agent. The orifice plates 37 are preferably secured to the bottoms of the radial baffles 32. The orifice plates can be located at places other than the bottom of the stripper cells but placing them at higher points reduces the effective length of the stripper cell. As indicated above, the orifice plate should be designed to give a pressure drop of from 0.1 to 5.0 lbs. per square inch. This pressure drop suffices to even out the flow through the several cells and to prevent upflow or recycling of stripped catalysts from the bottom of one stripping cell upwardly through an adjoining cell.

The steam inlet 33 to the bottom of the stripper is shown in Fig. 1 as a single nozzle. By providing for the discharge of the stripping gas or steam at a plurality of points or in several directions it is possible to improve materially the contact of catalyst particles and stripping gas. The stripping gas inlet means can take many forms. For example, it can comprise an elongated pipe having a plurality of holes drilled therein or it can be provided with one or more side arms of the same or different size with one or more outlet holes therein or it could comprise a ring-shaped member with a plurality of openings for the discharge of stripping gas. Uniform distribution of the stripping agent can also be achieved as shown in Fig. 4 by arranging a suitable baffle such as a disc 43, provided with a plurality of openings 44 over the outlet of a single nozzle in order to break up or disperse the stream of stripping gas.

Figure 6:
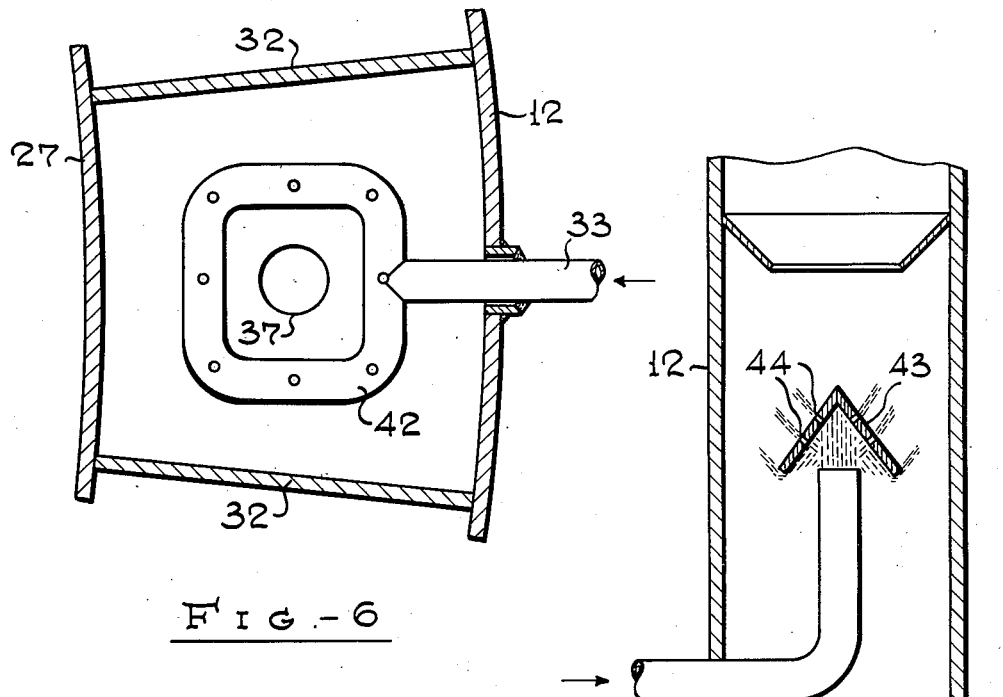
Fig. 6 is a plan view of the orifice and steam distributor of Fig. 5.
Figures 4, 5:
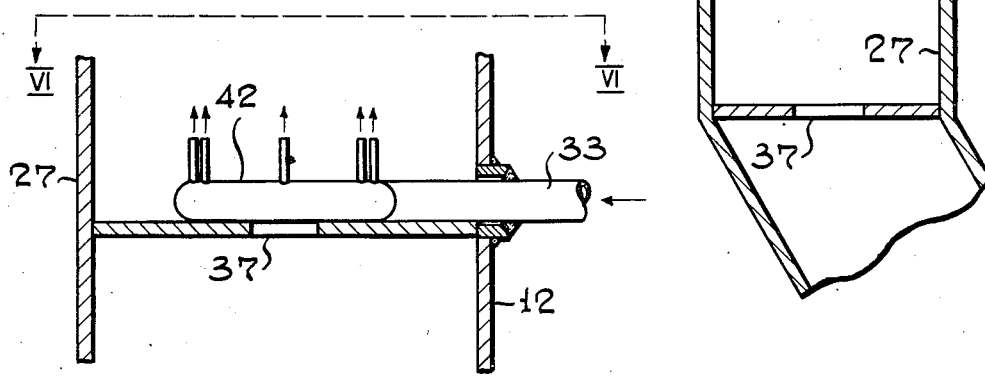
Fig. 4 is a sectional view of the bottom portion of a stripper cell showing means for distributing the stripping steam.
Fig. 5 is a sectional view of a catalyst flow restriction orifice provided with stripping steam distributor means in close proximity thereto.

A preferred arrangement is shown in Figures 5 and 6. In this embodiment, the stripping gas distributor is in the form of a ring 42 arranged directly above the catalyst restricting orifice plate 37. By making the distributor member in this form, even distribution of the stripping gas is achieved and by arranging the distributor directly adjacent the orifice, the catalyst particles are maintained in a fluidized condition right up to the catalyst outlet port.

The operation of the apparatus in accordance with the present invention will now be described in connection with the catalytic cracking of hydrocarbons. In such catalytic cracking operations the reactant fluid or feed stock comprise hydrocarbons such as, gas oil, reduced crude, petroleum oil, whole crude and heavy naphtha in liquid or vapor form or partly in liquid and partly in vapor form. The catalyst or contact particles may comprise acid treated bentonitic clay, synthetic silica-alumina or silica-magnesia gels or mixtures thereof with activators and promoters such oxides as zinc, calcium, thorium, boron, zirconium, vanadium, chromium, molybdenum and the like or any other suitable cracking catalyst. The catalyst particles may be of any desired form, micro spherical particles being particularly convenient. The major proportion of the catalyst particles are ordinarily from about 20 to 200 microns in diameter.

Hot powdered catalyst such as a silica-magnesia cracking catalyst supplied from standpipe 15 and relatively heavy hydrocarbon oil such as, gas oil supplied through the feed inlet in vaporized or partially vaporized condition are passed through inlet line 14 into inlet chamber 17 at temperatures between 800 and 1100° F. preferably at about 975° F. The catalyst to oil ratio may vary between about 5:1 and about 30:1 by weight. The mixtures of powdered catalyst and hydrocarbon vapors are passed from the inlet chamber 17 through the distribution plate or grid 19 into the reactor proper to form a fluidized dry liquid simulating mixture or dense bed 20 in the reaction vessel. Velocity of the vaporized hydrocarbon materials through the bed is from about 0.6 to 2.0 ft. per second and the density of the catalyst in the dense bed 20 varies from about 10 to 30 lbs. per cu. ft.

The vaporous reaction products leaving the dense bed 20 carry along small amounts of the catalyst fines forming a dilute phase 22. The reaction products are discharged through the cyclone separators 23 for separating catalyst fines which are returned to the dense bed 20 through dip leg 24 while vaporous reaction products pass overhead through line 25 to suitable recovery or treating equipment.

During the cracking operation the catalyst particles become spent by the deposition of coke or carbonaceous material thereon. The spent or contaminated catalyst particles in fluidized condition and containing adsorbed and entrained hydrocarbon vapors and gases are withdrawn continuously through the annular stripping space 26. As the spent catalyst particles descend through the stripping cells they are contacted countercurrently with steam or other suitable stripping gas supplied through line 37. By discharging the catalyst from the stripping cell through the orifice plates 37 a substantial pressure drop is taken and uniform distribution and flow of catalyst through the several cells is achieved and the danger of upflow occurring to carry stripped catalyst particles back into the dense bed is obviated. The stripped catalyst particles pass into the conical passageway 38 and then into standpipe 39 whence they are discharged into a regenerator wherein the coke or carbonaceous deposits are burned off rendering the catalyst particles suitable for recycling to standpipes 15 and thence into the reaction vessel 10. Steam or other aerating gas may be introduced into passageway 38 through lines 41 in order to fluidize the catalyst particles.

While the improved stripper arrangement has been specifically described in connection with the catalytic cracking of hydrocarbons it is to be understood that the apparatus may be used for removing volatile material from other solid contact particles in other reactions such as the dehydrogenation of butane or butylene fractions, aromatization of naphtha fractions, coking of heavy residues and the like; and also may be used generally in other reactions involving contact of solid particles with gaseous or vaporous reactants. For example, the apparatus could also be applied in the treatment of known hydrocarbon materials such as the oxidation of alcohol to aldehydes or acids or to the preparation of anhydrous hydrogen chloride.

While the best known form of apparatus has been described above, it is to be understood that that is by way of illustration only and that various changes and modifications may be made without departing from the spirit of this invention.

What is claimed is:

1. An apparatus of the character described including a vessel, an inlet chamber in the bottom portion thereof for the supply of gasiform fluid and finely divided solids to said vessel, an outlet for gasiform fluid in the upper part of said vessel, an outlet for solids in the bottom portion of said vessel, a horizontally arranged perforated member at the upper portion of said inlet chamber, said perforated member being concentric with said vessel and of smaller diameter, a vertically disposed sleeve extending above said perforated member and secured to the periphery thereof, said sleeve being spaced from the inner wall of said vessel to provide an annular space for the withdrawal of solids, radial baffles arranged between the outer wall of said sleeve and the inner wall of said vessel for dividing said annular space into a plurality of long narrow stripping cells, means for introducing a stripping agent into the lower portion and substantially uniformly over the entire cross-section of each of said cells, an orifice plate horizontally arranged in the bottom portion of each of the said stripping cells below said means for introducing the stripping agent, said orifice plate being constructed to produce a substantial pressure drop across said orifice to control the flow of solids through the cells into the bottom outlet for solids.

2. An apparatus according to claim 1 wherein each of said cells is provided with baffle means to increase contacting between the solids and the stripping agent in said cells.

3. An apparatus of the character described including a vessel, an inlet chamber in the lower portion of said vessel for the supply of gasiform fluid and finely divided solids to said vessel, an outlet for gasiform fluid in the upper part of said vessel, a horizontally arranged perforated member at the upper portion of said inlet chamber for distributing the gasiform fluid and finely divided solids to the vessel, a cylindrical sleeve surrounding said inlet chamber, said sleeve being spaced from the inner wall of said vessel to provide an annular space for the withdrawal of solids from the vessel, radial baffles arranged between the outer wall of said cylindrical sleeve and the inner wall of said vessel for dividing said annular space into a plurality of long narrow stripping cells, means for introducing a stripping gas into the lower portion of each of said cells, a chamber at the bottom of said vessel for receiving the solids discharged from the bottom of said cells, and outlet line for the discharge of solids connected to said last named chamber and an orifice plate horizontally arranged in the bottom portion of each of said cells below said means for introducing stripping agent, said orifice plate being constructed to produce a substantial pressure drop across said orifice to control the flow of solids through said cells into said bottom chamber.

EGER V. MURPHREE.

REFERENCES CITED

The following references are of record in the file of this patent:

UNITED STATES PATENTS

| Number | Name | Date |
|---|---|---|
| 2,304,128 | Thomas | Dec. 8, 1942 |
| 2,415,755 | Ogorzaly et al. | Feb. 11, 1947 |
| 2,415,756 | LeRoi et al. | Feb. 11, 1947 |